L. H. PERLMAN.
WHEEL.
APPLICATION FILED FEB. 23, 1917.
1,271,936.
Patented July 9, 1918.
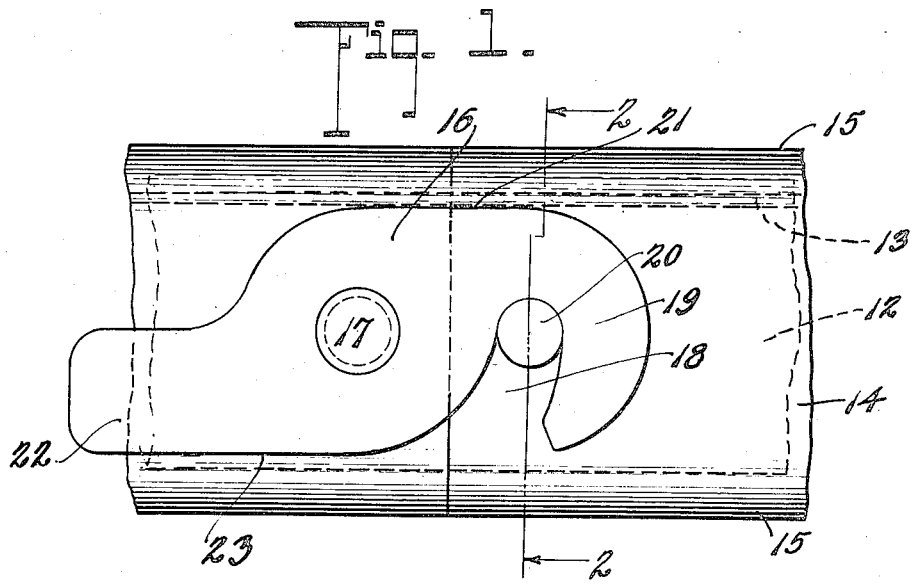
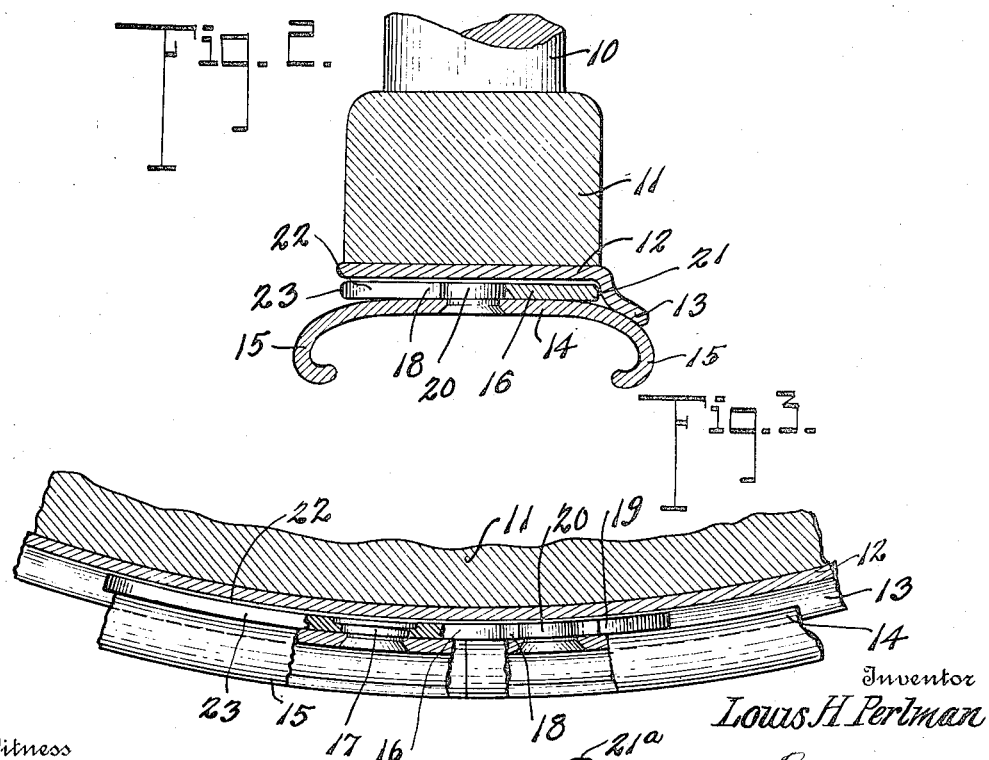
Witness
C. H. Wagner.
C. H. Sesler.
Inventor
Louis H. Perlman
By
Edgar M. Kitchin
his Attorney

UNITED STATES PATENT OFFICE.

LOUIS H. PERLMAN, OF NEW YORK, N. Y.

WHEEL.

1,271,936.  Specification of Letters Patent.  Patented July 9, 1918.

Application filed February 23, 1917. Serial No. 150,489.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to cross-cut demountable rims of wheel bodies of the carrier type for automobiles and the like, and has particular reference to means for securing the ends of the demountable rims together.

An object is to provide a demountable rim of the cross-cut type with locking means of such construction, and which is so mounted on the rim, that it may be held in locking position by engagement with the adjacent portion of the wheel body when the rim is mounted thereon.

Another object is to provide a cross-cut demountable rim with a locking member for the ends thereof which may be held from movement by the wheel body when the rim is fitted thereto with either edge of the rim applied first.

The above, and other objects and advantages of this invention will be in part brought out and in part understood from the following detailed description.

In the accompanying drawing:—

Figure 1 is a fragmentary inner face view of a cross-cut demountable rim showing the meeting ends thereof, and having a locking means applied thereto constructed according to the present invention, the dotted lines showing the adjacent parts of a wheel body to which the rim may be applied.

Fig. 2 is a radial transverse section through the same on the line 2—2 of Fig. 1.

Fig. 3 is a fragmentary circumferential section through a wheel body and a rim mounted thereon with the attaching means of this invention applied thereto.

Fig. 4 is a view similar to Fig. 1, on a reduced scale, showing a slight modification in the form of the securing means for the ends of the rim.

Referring to the drawing, 10 designates a spoke, 11 the felly, and 12 the felly band or fixed rim of a wheel body, the fixed rim having the usual supporting stop flange 13 at one edge thereof. A demountable rim 14, of the cross-cut type, is adapted to be mounted on the wheel body, and is provided with tire-engaging flanges 15 of any suitable type, the plain clencher type being shown in the present instance.

The meeting ends of the demountable rim 14 normally abut in the usual manner and are held in such relation and from spreading apart by a hook 16 which may be in the form of a flat plate pivoted intermediate its ends upon a rivet 17 projecting from the inner face of the demountable rim 14 adjacent to one end of the same. The hook 16 is flat against the inner face of the rim and is provided in one edge, and near one end, with a recess or throat 18 forming a bill 19 at said end of the hook. The throat 18 of the hook is adapted to receive therein a stud 20 which projects from the inner face of the rim 14 near the opposite end of the same.

The hook 16 is provided at its inner end with a substantially straight lateral abutting edge 21 opposite to said edge through which the throat 18 opens, the straight edge merging from the bill 19 and extending along the pivoted portion of the plate. The opposite or inner end of the hook 16 is preferably reduced in width by cutting the plate away at the side along which the edge 21 extends to provide a tail piece or projection 22 which extends in the general direction of the body of the hook.

The plate or body of the hook 16 is of a width at its pivoted portion sufficient to engage either edge of the hook with the stop flange 13 of the felly band when the rim is fitted to the wheel body, which construction admits the placing of the demountable rim upon the wheel body with either side of the rim outward. The tail piece 22 has a substantially straight outer edge 23 formed at the opposite side and at the opposite end of the plate from the edge 21, the edges 21 and 22 being located to hold the hook from turning out of engagement with the stud 20 when either edge is in engagement with the stop flange 13.

In the form disclosed in Fig. 4, the hook 16$^a$ is of substantially the same form as shown in Fig. 1, except that the tail piece 22$^a$, at the inner end of the hook, tapers toward its free end, is relatively narrow, and extends obliquely from the longitudinal axis of the hook in the same direction in which the throat 18 of the hook opens, providing at its free end an abutting edge or point 23ª. The stud engaging end of the hook 16ª is provided with a projecting lug or lateral abutting edge 21ª at the closed side of the hook.

In this modified construction, the demountable rim may be placed on the wheel body with either the edge 21ª or the edge 23ª facing the stop flange 13 of the felly band. When the rim 14 is secured in place either one of these abutting edges engage the stop flange and hold the hook 16ª from turning on its pivot 17 out of engagement with the stud 20, thus preventing the accidental dislodgment of the hook.

With the first-described form of the invention, the rim 14 may be fitted at either side upon the wheel body, and either the straight edge 21 or the straight edge 23 is brought into contact with the stop flange 13, thus securely holding the hook 16 from turning about its pivot and releasing the stud 20.

In both forms of the invention the abutting edges of the hook are located at the opposite sides and at the opposite ends of the hook, and in such positions as to prevent, when the demountable rim 14 is in place, the turning of the hook in such direction as to release the stud 20.

The invention embraces such other changes and modifications in the above specifically described embodiment as are within the scope of the following claims.

What I claim is:

1. The combination with a wheel body, and a cross-cut demountable rim therefor, of a pivoted locking member on the rim for securing the ends thereof together, and means on the locking member for engagement with the wheel body to hold the member against pivotal play in locking position upon the placing of the rim on the wheel body with either of the rim edges presented first.

2. The combination with a wheel body, and a cross-cut demountable rim therefor, of a locking member pivoted intermediate its ends to one end of the rim and adapted for engagement at one end with the opposite end of the rim to hold said ends together, and means on the locking member for engagement with the wheel body to hold the member from swinging movement in the direction of the unlocked position when the rim is applied on the wheel body with either edge of the rim presented first.

3. The combination with a wheel body, and a cross-cut demountable rim therefor, of a hook pivoted to one end of the rim and having a throat opening through one edge thereof, and a stud projecting from the opposite end of the rim adapted to be engaged by said throat of the hook, said hook having an abutting edge at its closed side and having a tail piece at its inner end with an abutting edge facing the edge through which the throat opens, said abutting edges being adapted for interchangeable engagement with the wheel body to hold the hook from swinging out of engagement with the stud when the rim is applied on the wheel body with either edge of the rim presented first.

4. The combination with a wheel body having the usual supporting stop flange, and a cross-cut demountable rim for the wheel body, of a hook pivoted against the inner face of the rim at one end thereof and having a throat opening through one edge of the hook, and a stud projecting from said inner face of the rim adapted to be received in said throat for holding the rim ends together, said hook having an abutting edge at the closed side thereof and having a tail piece at its inner end with an abutting edge facing the open side of the hook, said abutting edges being adapted for contact with the stop flange to hold the hook from turning out of engagement with the stud upon the placing of the rim on the wheel body with either edge of the rim presented first.

In testimony whereof I affix my signature in presence of two witnesses.

LOUIS H. PERLMAN.

Witnesses:
I. B. LEIBSON,
EDGAR M. KITCHIN.